US010817462B1

(12) United States Patent
Dastidar et al.

(10) Patent No.: US 10,817,462 B1
(45) Date of Patent: Oct. 27, 2020

(54) MACHINE LEARNING MODEL UPDATES TO ML ACCELERATORS

(71) Applicant: Xilinx, Inc., San Jose, CA (US)

(72) Inventors: Jaideep Dastidar, San Jose, CA (US); Millind Mittal, Saratoga, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/396,540

(22) Filed: Apr. 26, 2019

(51) Int. Cl.
*G06F 15/78* (2006.01)
*H04L 12/66* (2006.01)
*G06N 20/00* (2019.01)
*G06F 13/42* (2006.01)
*G06F 3/06* (2006.01)
*G06F 9/54* (2006.01)

(52) U.S. Cl.
CPC .......... *G06F 15/7825* (2013.01); *G06F 3/067* (2013.01); *G06F 9/544* (2013.01); *G06F 9/546* (2013.01); *G06F 13/4282* (2013.01); *G06N 20/00* (2019.01); *H04L 12/66* (2013.01); *G06F 2213/0026* (2013.01)

(58) Field of Classification Search
CPC .. G06F 3/067; G06F 2009/4557; G06N 20/00
See application file for complete search history.

(56) References Cited

U.S. PATENT DOCUMENTS

| 10,445,659 B2 * | 10/2019 | Bowers | G06F 3/067 |
| 10,698,842 B1 * | 6/2020 | Dastidar | G06F 9/544 |
| 2018/0131637 A1 * | 5/2018 | Hughes | H04L 12/66 |
| 2018/0287964 A1 | 10/2018 | Gray | |
| 2019/0004990 A1 | 1/2019 | Van Doren et al. | |
| 2019/0042292 A1 | 2/2019 | Palermo et al. | |
| 2019/0042425 A1 | 2/2019 | Shifer | |
| 2019/0042455 A1 | 2/2019 | Agarwal et al. | |
| 2020/0125384 A1 * | 4/2020 | Serebrin | G06F 9/4856 |
| 2020/0133898 A1 * | 4/2020 | Therene | G06F 3/0679 |
| 2020/0213228 A1 * | 7/2020 | Cheng | H04L 67/1006 |

OTHER PUBLICATIONS

U.S. Appl. No. 15/967,473, filed Apr. 30, 2018, Entitled: "Circuit for and Method of Providing a Programmable Connector of an Integrated Circuit Device", San Jose, CA USA.

(Continued)

*Primary Examiner* — Raj Jain
(74) *Attorney, Agent, or Firm* — Patterson + Sheridan, LLP

(57) ABSTRACT

Examples herein describe a peripheral I/O device with a hybrid gateway that permits the device to have both I/O and coherent domains. As a result, the compute resources in the coherent domain of the peripheral I/O device can communicate with the host in a similar manner as CPU-to-CPU communication in the host. The dual domains in the peripheral I/O device can be leveraged for machine learning (ML) applications. While an I/O device can be used as an ML accelerator, these accelerators previously only used an I/O domain. In the embodiments herein, compute resources can be split between the I/O domain and the coherent domain where a ML engine is in the I/O domain and a ML model is in the coherent domain. An advantage of doing so is that the ML model can be coherently updated using a reference ML model stored in the host.

8 Claims, 8 Drawing Sheets

(56) References Cited

OTHER PUBLICATIONS

U.S. Appl. No. 16/024,500, filed Jun. 29, 2018, Entitled: "Transparent Port Aggregation in Multi-Chip Transport Protocols", San Jose, CA USA.
U.S. Appl. No. 16/025,762, filed Jul. 2, 2018, Entitled: "Logical Transport Overlayed Over a Physical Transport Having a Tree Topology", San Jose, CA USA.
U.S. Appl. No. 16/053,384, filed Aug. 2, 2018, Entitled: "Logical Transport Over a Fixed PCIE Physical Transport Network", San Jose, CA USA.
U.S. Appl. No. 16/141,704, filed Sep. 25, 2018, Entitled: "Scalable Coherence Management Independent of Transport Protocol", San Jose, CA USA.
U.S. Appl. No. 16/053,488, filed Aug. 2, 2018, Entitled: "Hybrid Precise and Imprecise Cache Snoop Filtering", San Jose, CA USA.
U.S. Appl. No. 16/208,260, filed Dec. 3, 2018, Entitled: "Scratchpad Memory Management in a Computing System", San Jose, CA USA.

\* cited by examiner

MACHINE LEARNING MODEL UPDATES TO ML ACCELERATORS

TECHNICAL FIELD

Examples of the present disclosure generally relate to executing a machine learning model in a peripheral I/O device that supports both I/O and coherent domains.

BACKGROUND

In the traditional I/O model, a host computing system interfaces with its peripheral I/O devices when executing accelerator tasks or functions using custom I/O device drivers unique to the peripheral I/O device. Having multiple I/O devices or even multiple instances of the same I/O device means that the host interfaces with multiple I/O device drivers or multiple running copies of the same I/O device driver. This can result in security and reliability issues since the I/O device drivers are typically developed by the vendor supplying the peripheral I/O devices but must be integrated with all the software and hardware in the host computing system.

Meanwhile, the hardware cache-coherent shared-memory multiprocessor paradigm leverages a generic, instruction set architecture (ISA)-independent, model of interfacing in the execution tasks or functions on multiprocessor CPUs. The generic, ISA-independent (e.g., C-code) model of interfacing scales with both the number of processing units and the amount of shared memory available to those processing units. Traditionally, peripheral I/O devices have been unable to benefit from the coherent paradigm used by CPUs executing on the host computing system.

SUMMARY

Techniques for executing a machine learning model using I/O and coherent domains in a peripheral device are described. One example is a peripheral I/O device that includes a hybrid gateway configured to communicatively couple the peripheral I/O device to a host, I/O logic comprising a machine learning (ML) engine assigned to an I/O domain, and coherent logic comprising a ML model assigned to a coherent domain where the ML model shares the coherent domain with compute resources in the host.

One example described herein is a computing system that includes a host and a peripheral I/O device. The host includes a memory storing a reference ML model and a plurality of CPUs forming, along with the memory, a coherent domain. The I/O device includes I/O logic comprising a ML engine assigned to an I/O domain and coherent logic comprising a ML model assigned to the coherent domain along with the memory and the plurality of CPUs in the host.

One example described herein is a method that includes updating a subportion of a reference ML model in memory associated with a host, updating a subset of a cached ML model in coherent logic associated with a peripheral I/O device coupled to the host where the memory of the host and the coherent logic of the peripheral I/O device are in a same coherent domain, retrieving the updated subset of the cached ML model from the coherent domain, and processing a ML data set according to parameters in the retrieved subset of the cached ML model using an ML engine where the ML engine is in I/O logic in the peripheral I/O device assigned to an I/O domain.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Figure 1:
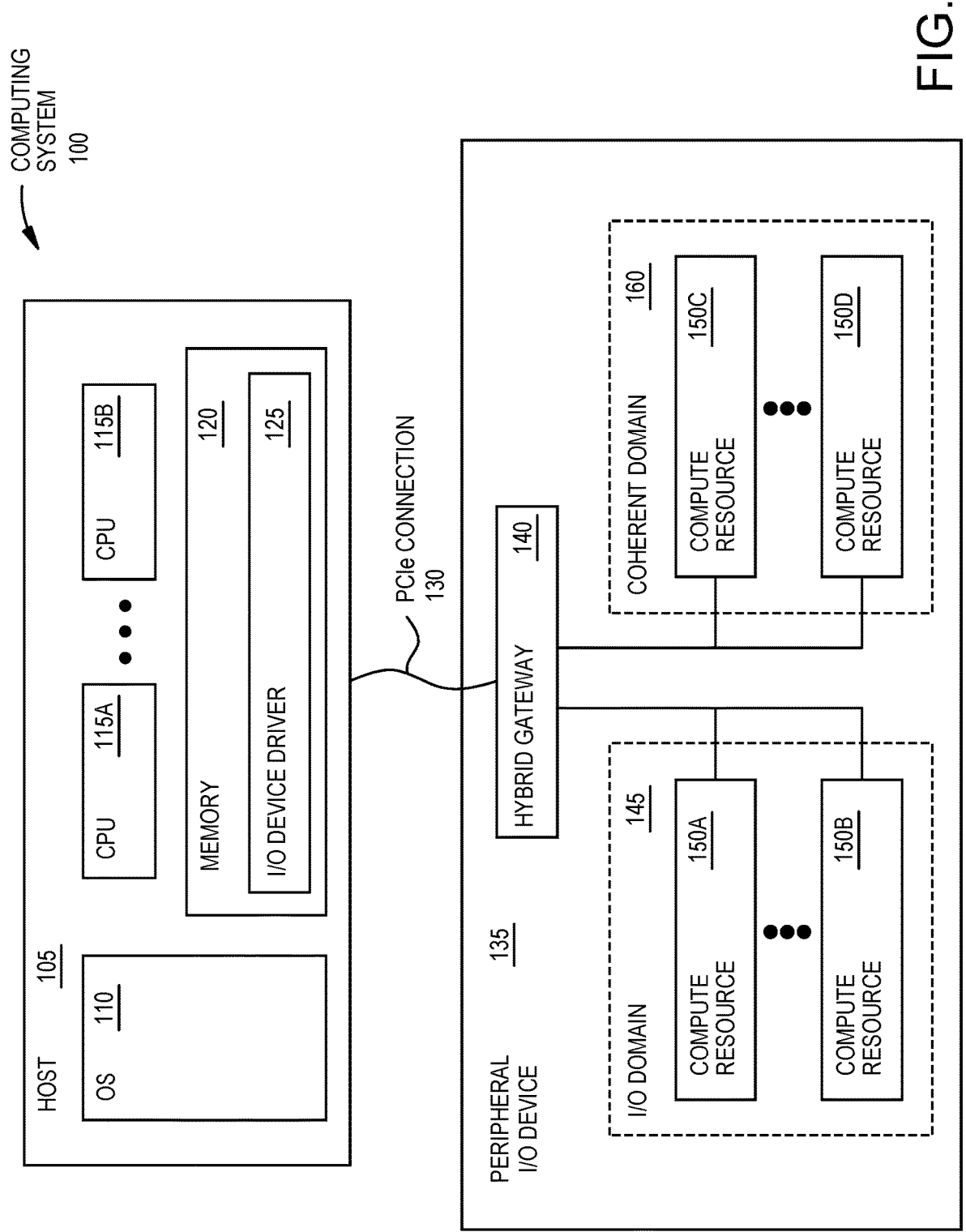
FIG. 1 is a block diagram of a host coupled to a peripheral I/O device with I/O and coherent domains, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe a peripheral I/O device with a hybrid gateway that permits the device to have both I/O and coherent domains. That is, the I/O device can enjoy the benefits of the traditional I/O model where the I/O device driver manages some of the compute resources in the I/O device as well as the benefits of adding other compute resources in the I/O device to the same coherent domain used by the processors (e.g., central processing units (CPUs)) in the host computing system. As a result, the compute resources in the coherent domain of the peripheral I/O device can communicate with the host in a similar manner as CPU-to-CPU communication in the host. This means the compute resources can take advantage of coherency type functions such as direct communication, more efficient memory usage, non-uniform memory access (NUMA) awareness, and the like. At the same time, the compute resources in the I/O domain can benefit from the advantages of the traditional I/O device model which provides efficiencies when doing large memory transfers between the host and the I/O device (e.g., direct memory access (DMA)).

The dual domains in the peripheral I/O device can be leveraged for machine learning (ML) applications. While an I/O device can be used as an ML accelerator, these accelerators previously only used an I/O domain. In the embodiments herein, compute resources can be split between the I/O domain and the coherent domain where a ML engine is assigned to the I/O domain and a ML model is stored in the coherent domain. An advantage of doing so is that the ML model can be coherently updated using a reference ML model stored in the host. That is, several types of ML applications benefit from being able to quickly (e.g., in real-time or with low latency) update the ML model or models in the I/O device. Storing the ML model in the coherent domain (instead of the I/O domain), means the cache-coherent shared-memory multiprocessor paradigm can be used to update the ML model which is much faster than relying on the traditional I/O domain model (e.g., a direct memory access (DMA)). The ML engine, however, can execute in the I/O domain of the peripheral I/O device. This is beneficial since the ML engine often processes large amounts of ML data which is more efficiently transferred between the I/O device and the host using DMA rather than a cache-coherent paradigm.

FIG. 1 is a block diagram of a host 105 coupled to a peripheral I/O device 135 with I/O and coherent domains, according to an example. The computing system 100 in FIG. 1 includes the host 105 which is communicatively coupled to the peripheral I/O device 135 using a PCIe connection 130. The host 105 can represent a single computer (e.g., a server) or multiple physical computing systems that are interconnected. In any case, the host 105 includes an operating system 110, multiple CPUs 115 and memory 120. The OS 110 can be any OS capable of performing the functions described herein. In one embodiment, the OS 110 (or a hypervisor or kernel) establishes a cache-coherent shared-memory multiprocessor paradigm for the CPUs 115 and memory 120. In one embodiment, the CPUs 115 and the memory 120 are OS managed (or kernel/hypervisor managed) to form a coherent domain that follows the cache-coherent shared-memory multiprocessor paradigm. However, as mentioned above, the traditional I/O model means the peripheral I/O device 135 (and all its compute resources 150) is excluded from the coherent domain established in the host 105. Instead, the host 105 relies on an I/O device driver 125 stored in its memory 120 which manages the compute resources 150 in the I/O device 135. That is, the peripheral I/O device 135 is controlled by, and is accessible through, the I/O device driver 125.

In the embodiments herein, the shared-memory multiprocessor paradigm is available to the peripheral I/O device 135 along with all the performance advantages, software flexibility, and reduced overhead of that paradigm. Further, adding compute resources in the I/O device 135 to the same coherent domain as the CPUs 115 and memory 120 allows for a generic, ISA-independent development environment. As shown in FIG. 1, some of the compute resources 150 in the peripheral I/O device 135 are assigned to a coherent domain 160 which is the same coherent domain 160 used by the compute resources in the host 105—e.g., the CPUs 115 and the memory 120.

While the compute resources 150C and 150D are logically assigned to the coherent domain 160, the compute resources 150A and 150B are assigned to an I/O domain 145. As such, the I/O device 135 benefits from having compute resources 150 assigned to both domains 145, 160. While the I/O domain 145 provides efficiencies when doing large memory transfers between the host 105 and the I/O device 135, the coherent domain 160 provides the performance advantages, software flexibility, and reduced overhead mentioned above. By logically dividing the hardware compute resources 150 (e.g., programmable logic, a network on the chip (NoC), data processing engines, and/or memory) into the I/O domain 145 and the coherent domain 160, the I/O device 135 can benefit from both types of paradigms.

To enable the host 105 to send and receive both I/O and coherent data traffic, the peripheral I/O device 135 includes a hybrid gateway 140 which separates the data received on the PCIe connection 130 into I/O data traffic and coherent data traffic. The I/O data traffic is forwarded to the compute resources 150A and 150B in the I/O domain 145 while the coherent data traffic is forwarded to the compute resources 150C and 150D in the coherent domain 160. In one embodiment, the hybrid gateway 140 can process the I/O and coherent data traffic in parallel so that the compute resources 150 in the I/O domain 145 can execute in parallel with the compute resources 150 in the coherent domain 160. That is, the host 105 can assign tasks to both the compute resources 150 in the I/O domain 145 and in the coherent domain 160 which can execute those tasks in parallel.

The peripheral I/O device 135 can be many different types of I/O devices such as a pluggable card (which plugs into an expansion slot in the host 105 or a separate expansion box), a system on a chip (SoC), a graphics processing unit (GPU), a field programmable gate array (FPGA) and the like. Thus, while many of the embodiments discuss an I/O device 135 that includes programmable logic (e.g., a programmable logic array), the embodiments can be applied to an I/O device 135 that does not have programmable logic but contains solely hardened circuit (which may be software programmable). Further, while the embodiments herein discuss dividing the compute resources 150 into two domains, in other embodiments the hybrid gateway 140 can be modified to support additional domains or multiple sub-domains within the I/O and coherent domains 145, 160.

In one embodiment, the hybrid gateway 140 and the host 105 use a coherent interconnect protocol to extend the coherent domain 160 into the peripheral I/O device 135. For example, the hybrid gateway 140 may use cache coherent interconnect for accelerators (CCIX) for extending the coherent domain 160 within the device 135. CCIX is a high-performance, chip-to-chip interconnect architecture that provides a cache coherent framework for heterogeneous system architectures. CCIX brings kernel managed semantics to the peripheral device 135. Cache coherency is automatically maintained at all times between the CPU(s) on the host 105 and the various other accelerators in the system which may be disposed on any number of peripheral I/O devices.

However, other coherent interconnect protocols may be used besides CCIX such as QuickPath Interconnect (QPI), Omni-Path, Infinity Fabric, NVLink, or OpenCAPI to extend the coherent domain in the host 105 to include compute resources in the peripheral I/O device 135. That is, the hybrid gateway can be customized to support any type of coherent interconnect protocol which facilitates forming a coherent domain that includes the compute resources in the I/O device 135.

Figure 2:
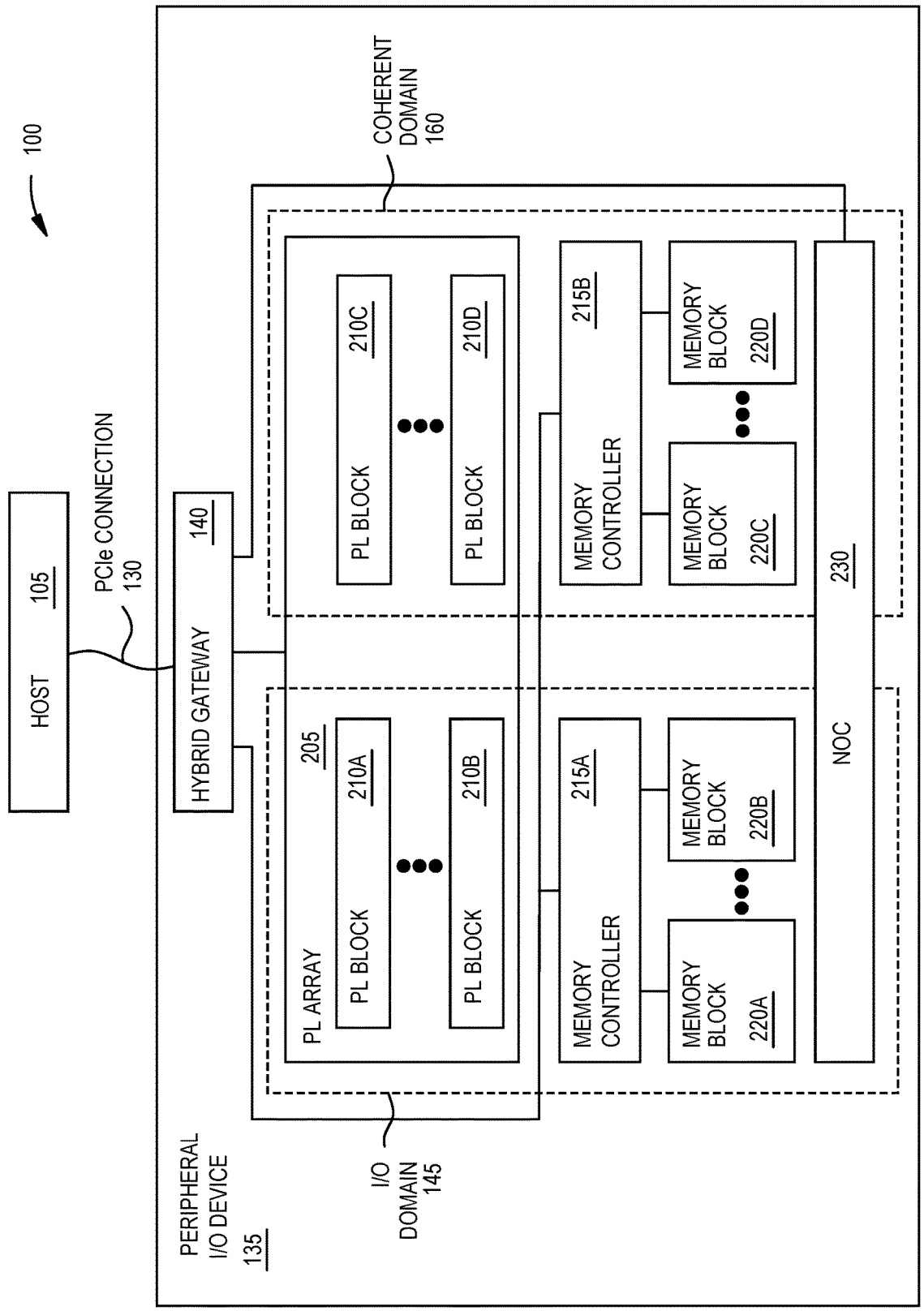
FIG. 2 is a block diagram of a peripheral I/O device with programmable logic, memory, and a network on a chip logically divided into I/O and coherent domains, according to an example.

FIG. 2 is a block diagram of a peripheral I/O device 135 with a programmable logic (PL) array 205, memory blocks 220, and a NoC 230 logically divided into I/O and coherent domains 145, 160, according to an example. In this example, the PL array 205 is formed from a plurality of PL blocks 210. These blocks can be individually assigned to the I/O domain 145 or the coherent domain 160. That is, the PL blocks 210A and 210B are assigned to the I/O domain 145 while the PL blocks 210C and 210D are assigned to the coherent domain 160. In one embodiment, the set of PL blocks 210 assigned to the I/O domain is mutually exclusive to the set of PL blocks 210 assigned to the coherent domain such that there is no overlap between the blocks (e.g., no PL block 210 is assigned to both the I/O and coherent domains).

In one embodiment, the assignment of the hardware resources to either the I/O domain 145 or the coherent domain 160 does not affect (or indicate) the physical location of the hardware resources in the I/O device 135. For example, the PL blocks 210A and 210C may be assigned to different domains even if these blocks neighbor each other in the PL array 205. Thus, while the physical location of the hardware resources in the I/O device 135 may be considered when logically assigning them to the I/O domain 145 and the coherent domain 160, it is not necessary.

The I/O device 135 also includes memory controllers 215 which are assigned to the I/O domain 145 and the coherent domain 160. In one embodiment, because of the physical interconnection between the memory controllers 215 and the corresponding memory blocks 220, assigning one of the memory controllers 215 to either the I/O or coherent domain 145, 160 means all the memory blocks 220 connected to the memory controller 215 are also assigned to the same domain. For example, the memory controllers 215 may be coupled to a fix set of memory blocks 220 (which are not coupled to any other memory controller 215). Thus, the memory blocks 220 may be assigned to the same domain as the memory controller 215 to which they are coupled. However, in other embodiments, it may be possible to assign memory blocks 220 coupled to the same memory controller 215 to different domains.

In one embodiment, the NoC includes interface elements which permit hardware elements in the I/O device 135 (e.g., configurable data processing engines, the memory blocks 220, the PL blocks 210, and the like) to transmit and receive data using the NoC 230. In one embodiment, rather than using programmable logic to form the NoC 230, some or all of the components forming the NoC are hardened. In any case, the NoC 230 can be logically divided between the I/O domain 145 and the coherent domain 160. In one embodiment, instead of assigning different portions of the NoC 230 to the two domains, the parameters of the NoC are configured to provide different service levels for the data traffic corresponding to the I/O domain 145 and the coherent domains 160. That is, the data traffic for both domains flowing in the NoC 230 may use the same hardware elements (e.g., switches and communication links) but may be treated differently by the hardware elements. For example, the NoC 230 can provide different quality of service (QoS), latency, bandwidth, for the two different domains. Further, the NoC 230 can also isolate the traffic of the I/O domain 145 from the traffic of the coherent domain 160 for security reasons.

In another embodiment, the NoC 230 can prevent the compute resources in the I/O domain 145 from communicating with the compute resources in the coherent domain 160. However, in one embodiment it may be advantageous to permit the compute resources assigned to the I/O domain 145 to communicate with compute resources assigned to the coherent domain 160. Previously, this communication would occur between the I/O device driver 125 and the OS in the host 105. Instead, inter-domain communication can occur within the I/O device 135 using the NoC 230 (if the compute resources are far apart in the device 135) or a fabric-to-fabric connection in the PL array 205 (if two PL blocks 210 assigned to the two different domains are close together and need to communicate).

Figure 3:
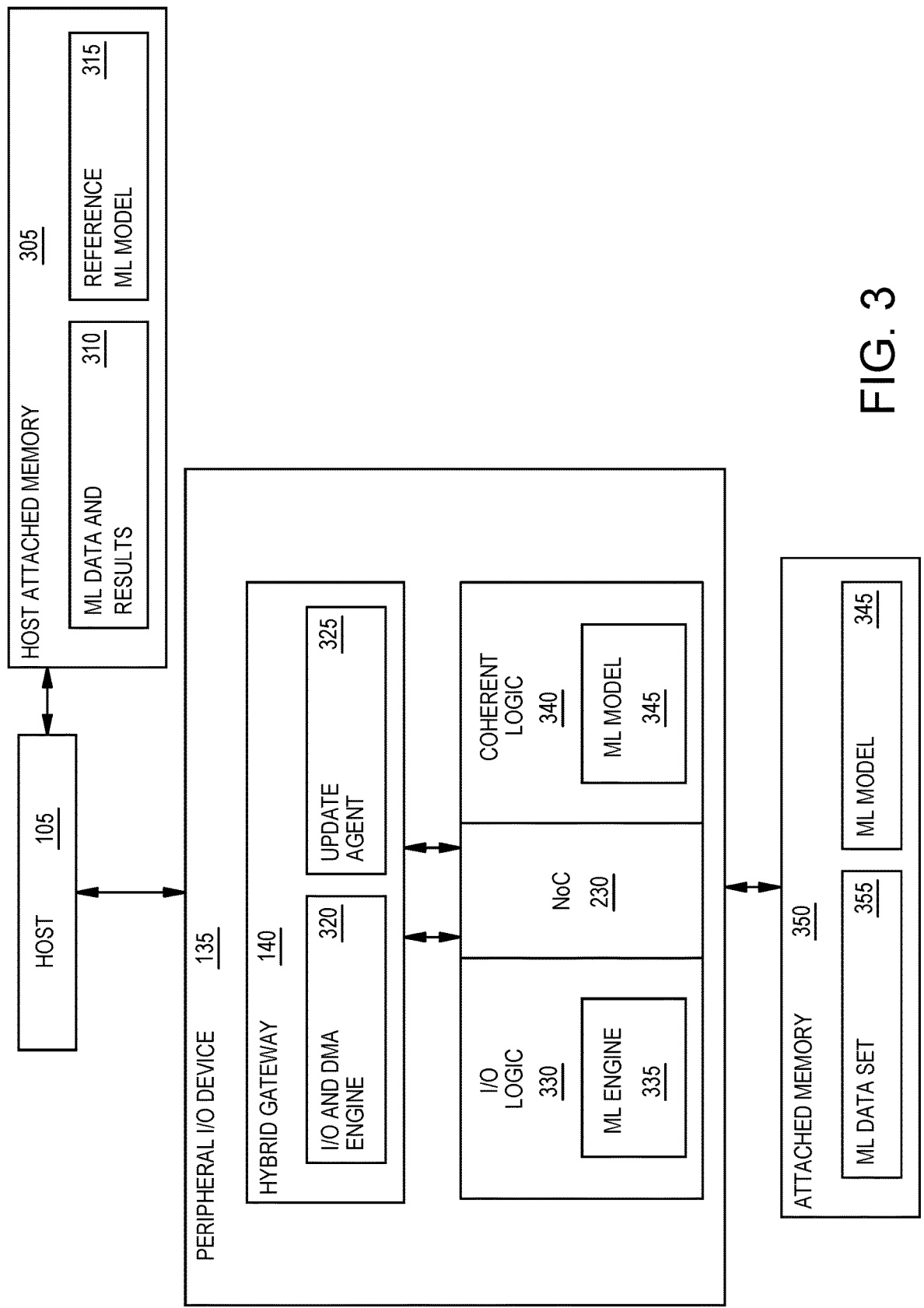
FIG. 3 is a block diagram of a peripheral I/O device with a machine learning model and a machine learning engine, according to an example.

FIG. 3 is a block diagram of a peripheral I/O device 135 with a ML model 345 and a ML engine 335, according to an example. In FIG. 3, the host 105 is coupled to a host attached memory 305 which stores ML data and results 310 and a reference ML model 315. The ML data and results 310 include the data that the host 105 sends to the peripheral I/O device 135 (e.g., a ML accelerator) for processing as well as the results the host 105 receives back from the I/O device 135. The reference ML model 315, on the other hand, defines the layers and parameters of the ML algorithm that the peripheral I/O device 135 uses for processing the ML data. The reference ML model 315 can also include a plurality of ML models, each defining the layers and parameters of a plurality of ML algorithms to be used for processing the ML data such that the host receives results across the ML algorithms. The embodiments herein are not limited to a particular ML model 315 and can include binary classification, multiclass classification, regression, neural networks (e.g., convolutional neural networks (CNN) or recurrent neural network (RNN)), and the like. The ML model 315 may define the number of layers, how the layers are interconnected, weights for each layer, and the like. Further, while the host attached memory 305 is shown as being separate from the host 105, in other embodiments, the ML data and results 310 and the ML model 315 are stored in memory within the host 105.

The host 105 can update the reference ML model 315. For example, as more data becomes available, the host 105 may change some of the weights in a particular layer of the reference ML model 315, change how the layers are interconnected, or add/delete layers in the ML model 315. As discussed below, these updates in the reference ML model 315 can be mirrored in the ML model 345 stored (or cached) in the peripheral I/O device 135.

The hybrid gateway 140 permits the coherent domain of the host 105 to extend to include hardware elements in the peripheral I/O device 135. In addition, the hybrid gateway 140 establishes an I/O domain which can use the traditional I/O model where the hardware resources assigned to this domain are managed by the I/O device driver. To do so, the hybrid gateway includes an I/O and DMA engine 320 which transfers I/O domain traffic between the host 105 and the I/O domain assigned hardware in the peripheral I/O device 135, and an update agent 325 which transfers coherent domain traffic between the host 105 and the coherent domain assigned hardware in the peripheral I/O device 135.

In this example, the hybrid gateway 140 (and the I/O and DMA engine 320 and the update agent 325) is connected to the NoC 230 which facilitates communication between the gateway 140 and the I/O logic 330 and coherent logic 340. The I/O logic 330 represents hardware elements in the peripheral I/O device 135 assigned to the I/O domain while the coherent logic 340 represents hardware elements assigned to the coherent domain. In one embodiment, the I/O logic 300 and the coherent logic 340 includes the PL blocks 210 and memory blocks 220 illustrated in FIG. 2. That is, a portion of the PL blocks 210 and memory blocks 220 form the I/O logic 330 while another portion forms the coherent logic 340. However, in another embodiment, the I/O logic 300 and coherent logic 340 may not include any PL but include hardened circuitry (which may be software programmable). For example, the peripheral I/O device 135 may be an ASIC or specialized processor which does not include PL.

As shown, the ML engine 335 is executed using the I/O logic 330 while the ML model 345 is stored in the coherent logic 340. As such, the ML model 345 is in the same coherent domain as the host attached memory 305 and the CPUs in the host 105 (not shown). In contrast, the ML engine 335 is not part of the coherent domain, and thus, is not coherently updated when the data stored in the memory 305 is updated or otherwise changed.

In addition, the peripheral I/O device 135 is coupled to an attached memory 350 which stores the ML model 345 (which may be a cached version of the ML model 345 stored in the coherent logic 340). For example, the peripheral I/O device 135 may not store the entire ML model 345 in the coherent logic 340. Rather, the entire ML model 345 may be stored in the attached memory 350 while certain portions of the ML model 345 that are currently being used by the ML engine 335 are stored in the coherent logic 340. In any case, the memory elements in the attached memory 350 storing the ML model 345 are part of the same coherent domain as the coherent logic 340 and the host 105.

The ML data set 355, in contrast, is stored in memory elements assigned to the I/O domain. For example, the ML engine 335 may retrieve data stored in the ML data set 355, process the data according to the ML model 345, and then store the processed data back into the attached memory 350. Thus, in this manner, the ML engine 335 and the ML data set 355 are assigned to hardware elements in the I/O domain while the ML model 345 is assigned to hardware elements in the coherent domain.

While FIG. 3 illustrates one ML engine and one ML model, the peripheral I/O device 135 can execute any number of ML engines and models. For example, a first ML model may be good at recognizing Object A in captured images in most instances, except when the image includes both Object A and Object B. However, a second ML model does not recognize Object A in many cases but is good at distinguishing between Object A and Object B. Thus, a system administrator may instruct the ML engine 335 to execute two different ML models (e.g., there are two ML models stored in the coherent logic 340). Further, executing the ML engine 335 and the ML model 345 may only require a fraction of the available compute resources in the peripheral I/O device 135. In that case, the administrator may execute another ML engine with its corresponding ML model in the device 135. Put differently, the I/O logic 330 may execute two ML engines while the coherent logic 340 stores two ML models. These pairs of ML engines/models may execute independently of each other.

Further, the assignment of the compute resources into the I/O and coherent domains may be dynamic. For example, a system administrator may determine there are not enough resources for the ML engine 335 in the I/O domain and reconfigure the peripheral I/O device 135 such that compute resources previously assigned to the coherent domain are now assigned to the I/O domain. For example, PL and memory blocks previously assigned to the coherent logic 340 may be reassigned to the I/O logic 330—e.g., the administrator may want to execute two ML engines or require the ML engine 335 to perform two ML models. The I/O device 135 can be reconfigured with the new assignments and the hybrid gateway 140 can simultaneously support operation of the I/O and coherent domains.

Figure 4:
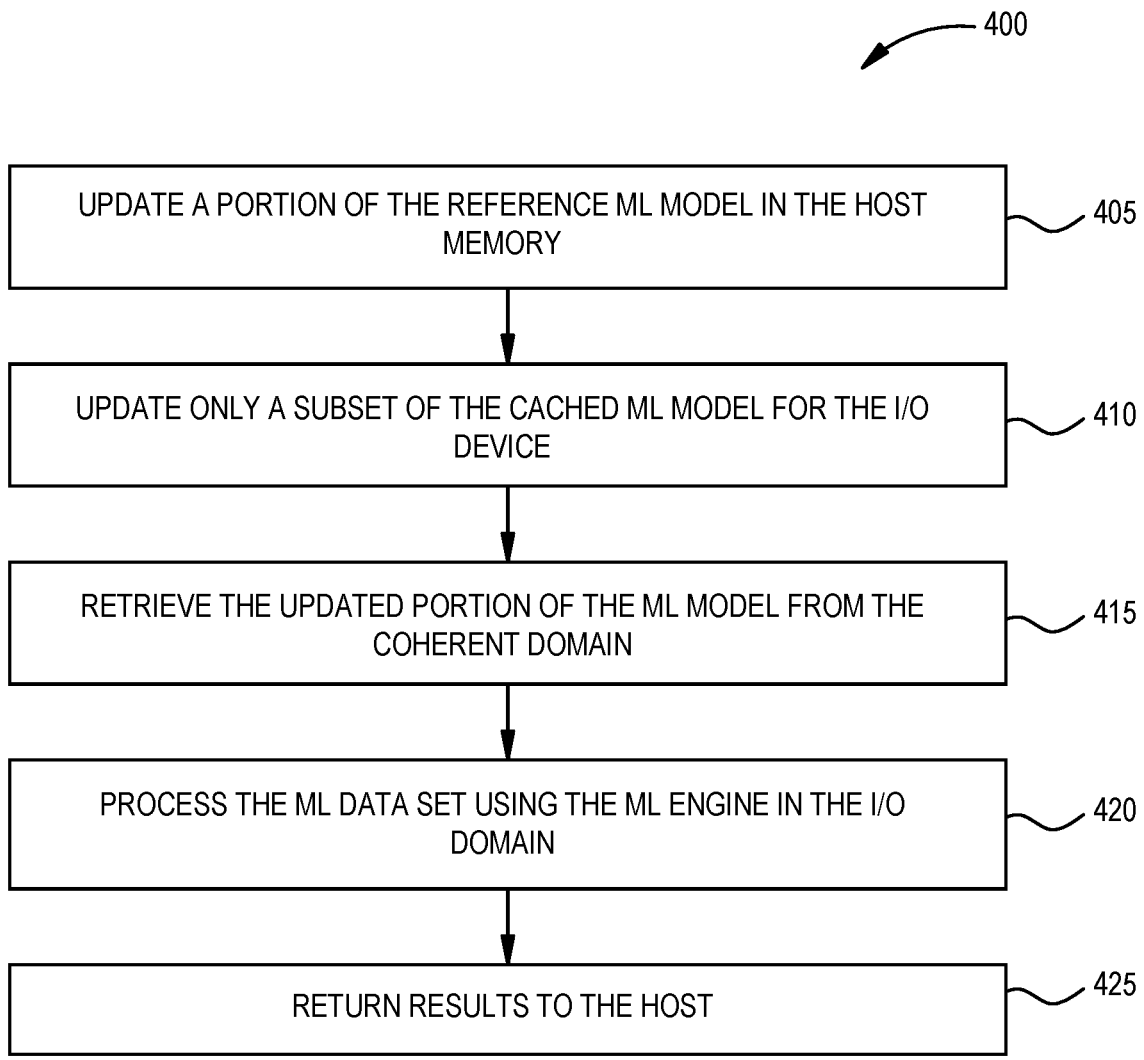
FIG. 4 is a flowchart for updating a machine learning model in a coherent domain of an I/O device, according to an example.

FIG. 4 is a flowchart of a method 400 for updating a ML model in a coherent domain of an I/O device, according to an example. At block 405, the host updates a portion of the reference ML model in its memory. For example, the OS in the host (or a software application in the host) may perform a training algorithm to change or tweak the reference model. In one embodiment, the ML model is used to evaluate images to detect a particular Object. When the Object is detected by the ML engine, the host may re-run the training algorithm which results in an update to the ML model. That is, because detecting the Object in an image can improve the training data, the host can decide to re-run the training algorithm (or a portion of the training algorithm) which may tweak the reference ML model. For example, the host may change the weights corresponding to one or more layers in the reference ML model, or change the manner in which the layers are interconnected. In another example, the host may add or delete layers in the reference ML model.

In one embodiment, the host updates only a portion of the reference ML model. For example, while the host changes the weights corresponding to one or more of the layers, the remaining layers in the reference ML models are unchanged. As such, much of the data defining the ML model may remain unchanged after re-running the training algorithm. For example, the reference ML model may have 20 Mbytes of data total, but the update may affect only 10% of that data. Under the traditional I/O device paradigm, an update to the reference ML model, regardless of how small, requires the host to transmit the entire ML model (the updated data and the data that was not updated) to the peripheral I/O device. However, by storing the ML model in the coherent domain of the peripheral I/O device, transmitting the entire reference ML model to the I/O device each time there is an update can be avoided.

At block 410, the host updates only a subset of the cached ML model for the peripheral I/O device. More particularly, the host transmits to the peripheral device the data that was updated in the reference ML model at block 410. This transfer occurs within the coherent domain, and thus, can behave like a transfer between memory elements within the CPU-memory complex of the host. This is especially useful in ML or artificial intelligence (AI) systems that rely on frequent (or low latency) updates to the ML models in the ML accelerators (e.g., the peripheral I/O device).

In another example, placing the ML model in the coherent domain of the I/O device may be useful when the same ML model is distributed across many different peripheral I/O devices. That is, the host may be attached to multiple peripheral I/O devices that all have the same ML models. Thus, rather than having to update the entire reference ML model, the coherent domain can be leveraged to update only the data that was changed in the reference ML model at each of the peripheral I/O devices.

At block 415, the ML engine retrieves the updated portion of the ML model in the peripheral I/O device from the coherent domain. For example, although the NoC may be able to keep the I/O domain and coherent domain traffic separate, the NoC can facilitate communication between hardware elements assigned to the I/O domain and the coherent domain when desired. But the NoC is just one of the transport mechanisms that can facilitate communication between coherency and I/O domain. Other examples include direct PL-to-PL messages or wire signaling, and communication via metadata written to a shared memory buffer between the two domains. Thus, the peripheral I/O device can transfer data from the ML model to the ML engine. Doing so enables the ML engine to process the ML data set according to the ML model.

In one embodiment, the ML engine may retrieve only a portion of the ML model during any particular time. For example, the ML engine may retrieve the parameters (e.g., weights) for one layer and configure the I/O logic to execute that layer in the ML model. Once complete, the ML engine can retrieve the parameters for the next layer of the ML model, and so forth.

At block 420, the I/O logic in the peripheral I/O device processes the ML data set using the ML engine in the I/O domain according to the parameters in the ML model. The ML engine can use an I/O domain technique such as DMA to receive the ML data set from the host. The ML data set can be stored in the peripheral I/O device or in an attached memory.

At block 425, the ML engine returns results of processing the ML data set using the parameters in the ML model to the host. For example, once finished, the DMA engine in the hybrid gateway can initiate a DMA write to transfer the processed data from the peripheral I/O device (or the attached memory) to the host using the I/O device driver.

Figure 5:
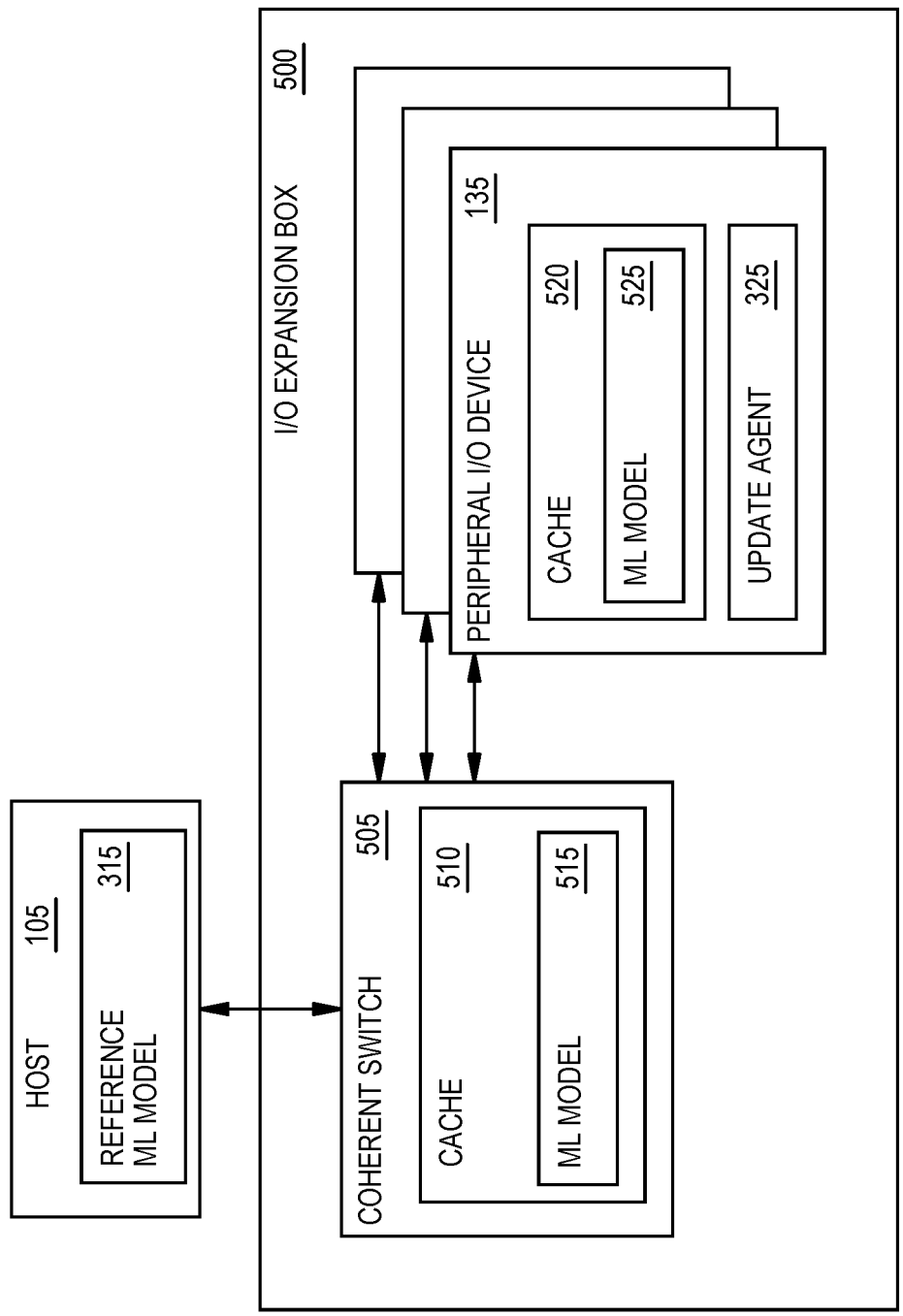
FIG. 5 is a block diagram of an I/O expansion box containing multiple I/O devices, according to an example.

FIG. 5 is a block diagram of an I/O expansion box 500 containing multiple I/O devices 135, according to an example. In FIG. 5, the host 105 communicates with a plurality of peripheral I/O devices 135 which may be separate ML accelerators (e.g., separate accelerator cards). In one embodiment, the host 105 can assign different task to the different peripheral I/O devices 135. For example, the host 105 may send different ML data sets to each of the peripheral I/O devices 135 for processing.

In this embodiment, the same ML model 525 is executed on all the peripheral I/O devices 135. That is, the reference ML model 315 in the host 105 is provided to each of the I/O devices 135 so that these devices 135 use the same ML model 525. As an example, the host 105 may receive feeds from a plurality of cameras (e.g., multiple cameras for a self-driving vehicle or multiple cameras in an area of a city). To process the data generated by the cameras timely, the host 105 may chunk up the data and send different feeds to different peripheral I/O devices 135 so that these devices 135 can evaluate the data sets in parallel using the same ML model 525. Thus, using an I/O expansion box 500 with multiple peripheral I/O devices 135 may be preferred in ML or AI environments were quick response time is important or desired.

In addition to storing the ML models 525 in the peripheral I/O device 135, the expansion box 500 includes a coherent switch 505 that is separate from the I/O devices 135. Nonetheless, the coherent switch 505 is also in the same coherent domain as the hardware resources in the host 105 and caches 520 in the peripheral I/O devices 135. In one embodiment, the cache 510 in the coherent switch 505 is another layer of cache that is between the caches 520 in the peripheral I/O devices 135 and the memory elements storing the reference ML Model 315 according to a NUMA arrangement.

While the host 105 could transmit N copies of the reference ML model 315 (where N is the total number of peripheral I/O devices 135 in the containers) to each device 135 when a portion of the reference ML model 315 is updated, because the caches 520 and 510 are in the same coherent domain, only the updated portion of the reference ML model 315 is transferred to the cache 510 and the cache 520. As such, the arrangement in FIG. 5 is able to scale better than embodiments where the ML models 525 are stored in hardware resources assigned to the I/O domain of the peripheral I/O devices 135.

Figure 6:
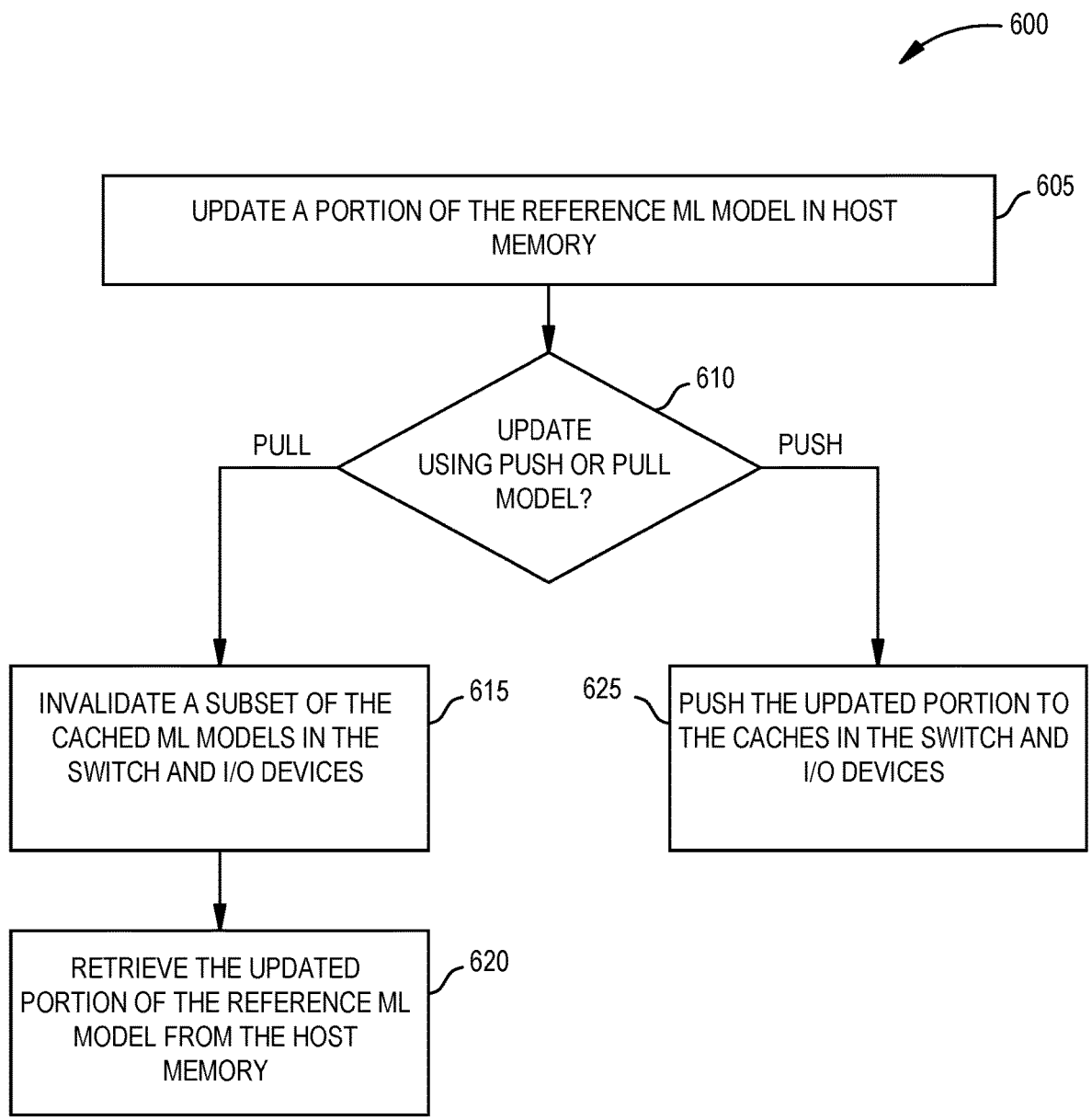
FIG. 6 is a flowchart for updating a machine learning model cached in multiple I/O devices, according to an example.

FIG. 6 is a flowchart of a method 600 for updating a machine learning model cached in multiple I/O devices, according to an example. In one embodiment, the method 600 is used to update multiple copies of ML models that are stored in multiple peripheral I/O devices coupled to a host, like the example illustrated in FIG. 5. At block 605, the host updates a portion of the reference ML model stored in host memory. The reference ML model can be stored in local memory or in attached memory. In either case, the reference ML model is part of a coherent domain shared by, for example, the CPUs in the host.

At block 610, the method 600 branches depending on whether a push model or a pull model is used to update the ML models. If a pull model is used, the method 600 proceeds to block 615 where the host invalidates a subset of the cached ML models in the switch and peripheral I/O devices. That is, in FIG. 5, the host 105 invalidates the ML model 515 stored in the cache 510 in the switch 505 and the ML models 525 stored in the caches 520 in the peripheral I/O devices 135. Because the ML models 525 are in the same coherent domain as the host 105, the host 105 does not need to invalidate all the data of the ML models 525, but only the subset that has been changed in response to updating the reference ML model 315.

At block 620, the update agent in the peripheral I/O devices retrieves the updated portion of the reference ML model from the host memory. In one embodiment, block 620 is performed in response to the ML engine (or any other software or hardware actor in the coherent switch or the peripheral I/O devices) attempting to access the invalidated subset of the ML models. That is, if the ML engine attempts to retrieve data from the ML model in the cache that was not invalidated, the requested data is provided to the ML engine. However, if the ML engine attempts to retrieve data from the invalidated portion of the cache (which is also referred to as a cache miss), doing so triggers block 620.

In one embodiment, after determining the requested data has been invalidated on the local cache in the peripheral I/O device (e.g., the cache 520), the update agent first attempts to determine whether the requested data is available in the cache in the coherent switch (e.g., the cache 510). However, as part of performing block 615, the host invalidates the same subset of the cache in both the coherent switch and the peripheral I/O devices 135. Doing so forces the update agent to retrieve the updated data from the reference ML model stored in the host.

In the pull model, the updated data in the reference ML model is retrieved after there is a cache miss (e.g., when the ML engine requests the invalidated cache entry from the ML model). As such, the peripheral I/O devices may perform block 620 at different times (e.g., on demand) depending on when the ML engine (or any other actor in the devices) requests the invalidated portions of the ML model.

In contrast, if the ML models are updated using a push model, at block 610 the method 600 proceeds to block 625 where the host pushes the updated portion to the caches in the switch and the peripheral I/O devices. In this model, the host controls when the ML models cached in the peripheral I/O devices are updated, rather than those ML models being updated when there is a cache miss. The host can push out the updated data in parallel or sequentially to the peripheral I/O devices. In any case, the host does not have to push out all of the data in the reference ML model, but only the portion of the reference ML model that was updated or changed.

Figure 7:
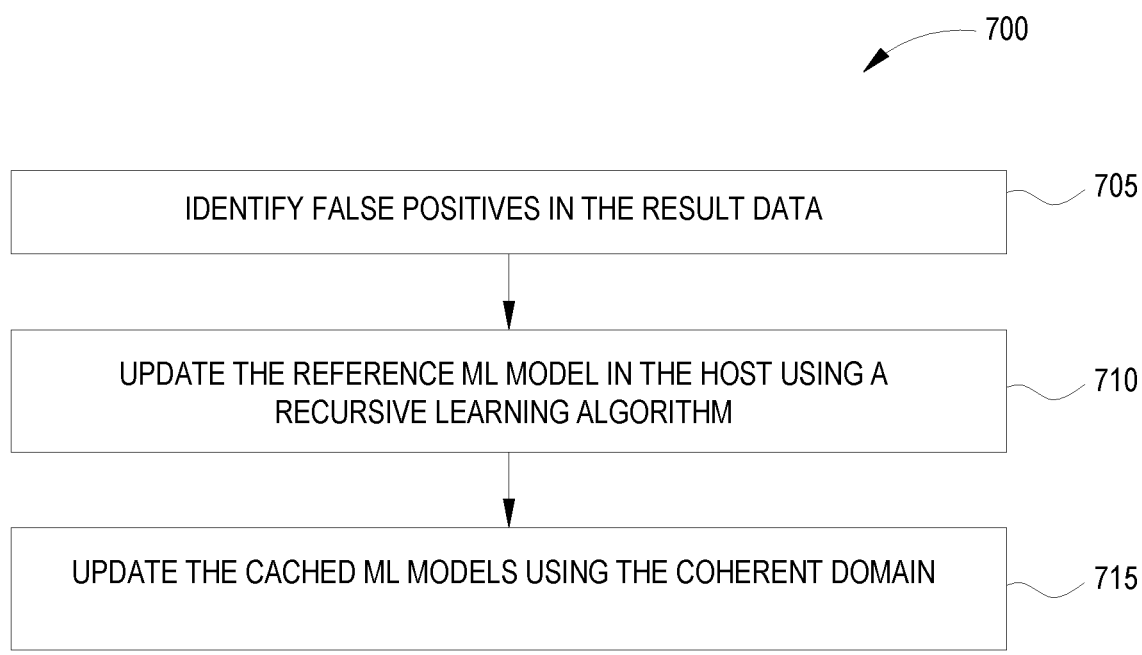
FIG. 7 is a flowchart for using a recursive learning algorithm to update a machine learning model, according to an example.

FIG. 7 is a flowchart of a method 700 for using a recursive learning algorithm to update a machine learning model, according to an example. In one embodiment, the method 700 can be used to update the reference ML model using information gained from executing the ML model in the peripheral I/O devices. At block 705, the peripheral I/O device (or the host) identifies false positives in the result data generated by the ML engine when executing the ML model. For example, the ML model may be designed to recognize a particular Object or Person in images but occasionally provides a false positive (e.g., identifies the Object or Person, but the Object or Person was not actually in the image).

At block 710, the host updates the reference ML model in the host using a recursive learning algorithm. In one embodiment, the recursive learning algorithm updates the training data used to train the reference ML model. In response to the false positives, the host can update the training data and then re-run at least a portion of the training algorithm using the updated training data. As such, the recursive learning algorithm can update the reference ML model in real time using the result data provided by the ML engine.

At block 715, the host updates the cached ML model(s) using the coherent domain. For example, the host can update the ML model or models in the peripheral I/O devices using the pull model described in blocks 615 and 620 of the method 600 or the push model described in block 625. Thus, by identifying false positives in resulting data generated by one or more of the peripheral I/O devices (e.g., one of the ML accelerators), the host can update the reference ML model. The host can then use the push or pull model to update the cached ML models on all of the peripheral I/O devices coupled to the host.

Figure 8:
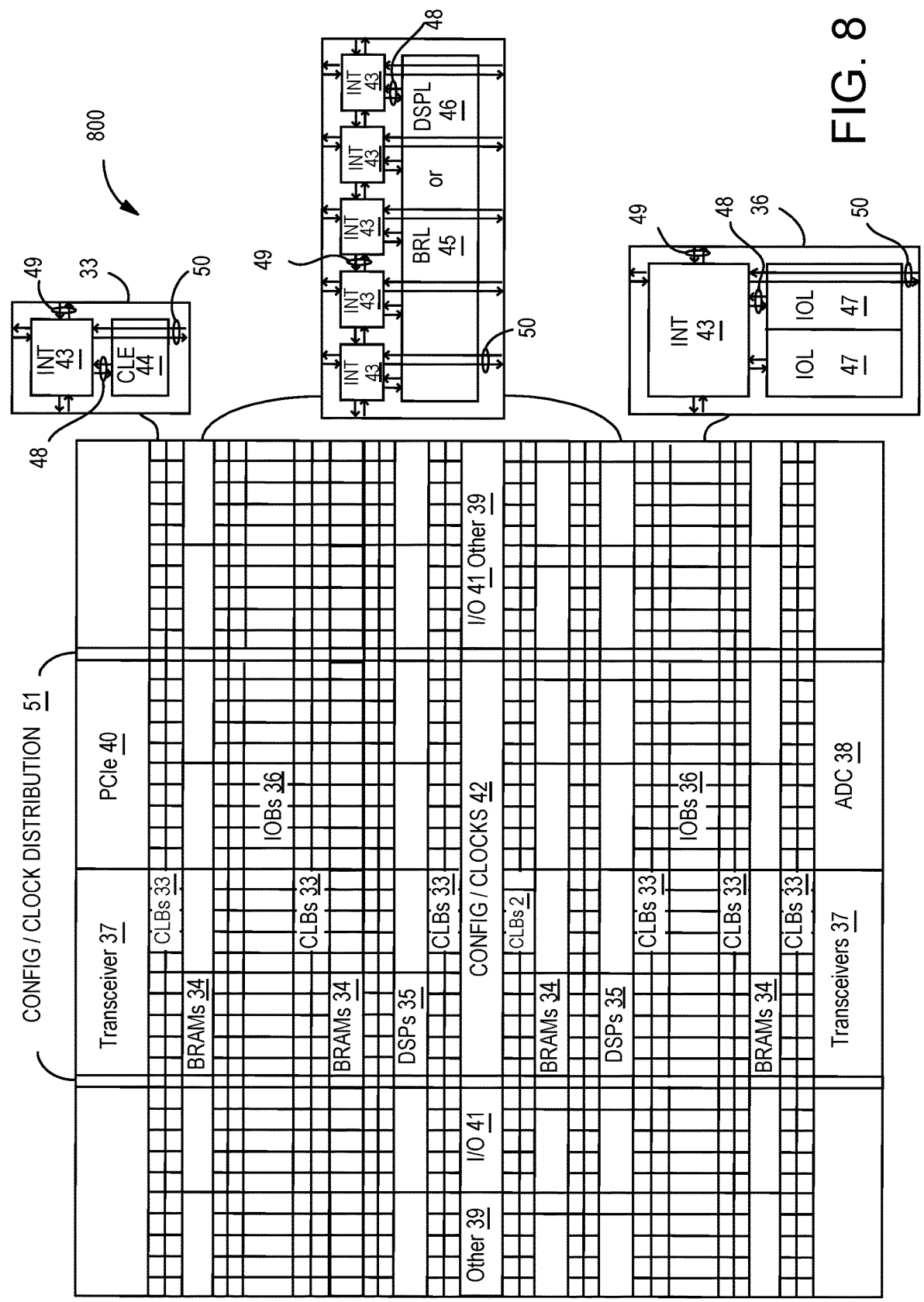
FIG. 8 illustrates a field programmable gate array implementation of a programmable IC according to an example.

FIG. 8 illustrates an FPGA 800 implementation of the I/O peripheral device 135, and more specifically with the PL array 205 in FIG. 2, that includes a large number of different programmable tiles including transceivers 37, CLBs 33, BRAMs 34, input/output blocks ("IOBs") 36, configuration and clocking logic ("CONFIG/CLOCKS") 42, DSP blocks 35, specialized input/output blocks ("IO") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 8. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP block 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual IO pads connected, for example, to the IO logic element 47 typically are not confined to the area of the input/output logic element 47.

In the pictured example, a horizontal area near the center of the die (shown in FIG. 8) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic.

Note that FIG. 8 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 8 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A peripheral I/O device, comprising:
   a hybrid gateway configured to communicatively couple the peripheral I/O device to a host;
   I/O logic comprising a machine learning (ML) engine assigned to an I/O domain; and
   coherent logic comprising a ML model assigned to a coherent domain, wherein the ML model shares the coherent domain with compute resources in the host.

2. The peripheral I/O device of claim 1, wherein the hybrid gateway is configured to use a coherent interconnect protocol to extend the coherent domain of the host into the peripheral I/O device.

3. The peripheral I/O device of claim 2, wherein the hybrid gateway comprises an update agent configured to use a cache-coherent shared-memory multiprocessor paradigm to update the ML model in response to changes made in a reference ML model stored in memory associated with the host.

4. The peripheral I/O device of claim 3, wherein using the cache-coherent shared-memory multiprocessor paradigm to update the ML model results in only a portion of the ML model being updated when the reference ML model is updated.

5. The peripheral I/O device of claim 1, further comprising:
   a NoC coupled to the I/O logic and the coherent logic, wherein at least one of the NoC, programmable logic (PL)-to-PL messages, and wire signaling is configured to permit parameters associated with a layer in the ML model to be transferred from the coherent logic to the I/O logic.

6. The peripheral I/O device of claim 5, wherein the ML engine is configured to process a ML data set received from the host using the parameters in the ML model.

7. The peripheral I/O device of claim 1, further comprising:
   a programmable logic (PL) array, wherein a first plurality of PL blocks in the PL array are part of the I/O logic and are assigned to the I/O domain and a second plurality of PL blocks in the PL array are part of the coherent logic and are assigned to the coherent domain.

8. The peripheral I/O device of claim 7, further comprising:
   a plurality of memory blocks, wherein a first subset of the plurality of memory blocks are part of the I/O logic and are assigned to the I/O domain and a second subset of the plurality of memory blocks are part of the coherent logic and are assigned to the coherent domain, wherein the first subset of the plurality of memory blocks can communicate with the first plurality of PL blocks but not directly communicate with the second plurality of PL blocks and the second subset of the plurality of memory blocks can communicate with the second plurality of PL blocks but not directly communicate with the first plurality of PL blocks.

* * * * *